United States Patent
Liu et al.

(10) Patent No.: US 9,319,827 B2
(45) Date of Patent: Apr. 19, 2016

(54) USER EQUIPMENT AND DEVICE-TO-DEVICE COMMUNICATION SELECTION METHOD THEREOF

(71) Applicant: Institute For Information Industry, Taipei (TW)

(72) Inventors: Shu-Tsz Liu, Taipei (TW); Tsung-Yu Tsai, Tainan (TW); Hsuan-Li Lin, Taipei (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 14/454,650

(22) Filed: Aug. 7, 2014

(65) Prior Publication Data
US 2015/0045044 A1    Feb. 12, 2015

Related U.S. Application Data

(60) Provisional application No. 61/863,924, filed on Aug. 9, 2013, provisional application No. 61/953,023, filed on Mar. 14, 2014.

(51) Int. Cl.
| | |
|---|---|
| *H04W 4/00* | (2009.01) |
| *H04W 8/00* | (2009.01) |
| *H04W 80/00* | (2009.01) |
| *H04W 4/20* | (2009.01) |

(52) U.S. Cl.
CPC .............. *H04W 4/005* (2013.01); *H04W 8/005* (2013.01); *H04W 4/20* (2013.01); *H04W 80/00* (2013.01)

(58) Field of Classification Search
CPC ....... H04W 8/005; H04W 4/005; H04W 4/20; H04W 80/00
See application file for complete search history.

(56) References Cited

U.S. PATENT DOCUMENTS

| 8,917,708 B2 * | 12/2014 | Venkatachalam et al. ..... 370/338 |
| 2011/0317569 A1 | 12/2011 | Kneckt et al. |
| 2012/0163252 A1 | 6/2012 | Ahn et al. |
| 2013/0288668 A1 * | 10/2013 | Pragada et al. ............ 455/426.1 |
| 2014/0004796 A1 * | 1/2014 | Cakulev et al. .............. 455/41.2 |
| 2014/0044007 A1 * | 2/2014 | Smadi ........................... 370/254 |
| 2014/0056220 A1 * | 2/2014 | Poitau et al. ................. 370/328 |
| 2014/0057667 A1 * | 2/2014 | Blankenship et al. ........ 455/500 |

(Continued)

FOREIGN PATENT DOCUMENTS

WO    2013055271 A1    4/2013

OTHER PUBLICATIONS

Office Action to the corresponding Taiwanese Patent Application rendered by the Taiwan Intellectual Property Office (TIPO) on Jan. 14, 2016, 16 pages. (including English translation).

*Primary Examiner* — Kenneth Lam
(74) *Attorney, Agent, or Firm* — Skaar Ulbrich Macari, P.A.

(57) ABSTRACT

A user equipment and a device-to-device communication selection method thereof are provided. The user equipment is configured to receive device-to-device communication information and discover device-to-device communication nodes. The user equipment is further configured to determine at least one selection procedure from a plurality of selection procedures according to the device-to-device communication information and select at least one first device-to-device communication target from the discovered device-to-device communication node(s) according to the determined selection procedure(s). The device-to-device communication selection method is for use in the user equipment to execute the aforesaid operations.

16 Claims, 5 Drawing Sheets

(56) References Cited

U.S. PATENT DOCUMENTS

| | | | |
|---|---|---|---|
| 2014/0094212 A1* | 4/2014 | Ahn et al. | 455/517 |
| 2014/0199969 A1* | 7/2014 | Johnsson et al. | 455/411 |
| 2014/0335853 A1* | 11/2014 | Sartori et al. | 455/426.1 |
| 2014/0342747 A1* | 11/2014 | Lee et al. | 455/450 |
| 2015/0045078 A1* | 2/2015 | Lee et al. | 455/509 |
| 2015/0127733 A1* | 5/2015 | Ding et al. | 709/204 |
| 2015/0156619 A1* | 6/2015 | Fodor et al. | |

* cited by examiner

USER EQUIPMENT AND DEVICE-TO-DEVICE COMMUNICATION SELECTION METHOD THEREOF

PRIORITY

This application claims priority to U.S. Provisional Patent Application No. 61/863,924 filed on Aug. 9, 2013, and U.S. Provisional Patent Application No. 61/953,023 filed on Mar. 14, 2014, which are both hereby incorporated by reference herein in their entirety.

FIELD

The present invention relates to a user equipment (UE) and a communication selection method thereof. More particularly, the present invention relates to a UE and a device-to-device (D2D) communication selection method thereof.

BACKGROUND

With development of the wireless broadband networks and mobile communication technologies, users have now been accustomed to use of various mobile apparatuses in dealing with different matters such as in working, communication or entertainment. For conventional wireless communication systems, data and control signals necessary for wireless communication between user equipments (UEs) must all be processed by a base station and a core network, and this will cause the problem of core network congestion in the conventional wireless communication systems. Correspondingly, the concept of device-to-device (D2D) communication has been proposed to cope with this problem. The D2D communication means that a UE can directly communicate with a target device without a base station or an access point (AP). As compared to the conventional way in which the UEs must communicate via a base station, the D2D communication has the advantages of reducing the transmission power, decreasing the transmission delay and improving the spatial reuse efficiency.

Unlike the conventional D2D communication technologies such as Bluetooth, Wireless Fidelity (Wi-Fi) or the like, the new generation of D2D communication technologies (e.g., the LTE D2D communication technology proposed by the $3^{rd}$ Generation Partnership Project (3GPP) Long Term Evolution/Long Term Evolution-Advanced (LTE/LTE-A)) attracts more and more attention because they can search for neighboring devices within a large range quickly by use of a legally authorized frequency spectrum and allow for direct communication under the control and assistance of the base station. Nevertheless, the new generation of D2D communication technologies are still confronted with various problems and challenges.

For example, the new generation of D2D communication technologies are implemented on the basis of the existing wireless communication architecture, so they have to share the pre-existing wireless frequency spectrum resources with the existing wireless communication systems. However, the conventional D2D communication technologies are only able to select UEs intended to perform D2D communication according to a single selection procedure (or a single selection parameter), so it is difficult to find out a UE that actually needs to communicate. Therefore, if the new generation of D2D communication technologies are only able to select a UE according to a single procedure, waste of the pre-existing wireless frequency spectrum resources will be caused. Accordingly, an urgent need exists in the art to provide an effective D2D communication selection technology for the new generation of D2D communication technologies.

SUMMARY

An objective of certain embodiments of the present invention includes providing an effective D2D communication selection technology for the new generation of D2D communication technologies.

To achieve this objective, a user equipment (UE) is provided in certain embodiments of the present invention. The UE comprises a receiving interface, a discovering interface and a selecting interface coupled to the receiving interface and the discovering interface. The receiving interface is configured to receive D2D communication information. The discovering interface is configured to discover D2D communication nodes. The selecting interface is configured to determine at least one selection procedure from a plurality of selection procedures according to the D2D communication information and select at least one first D2D communication target from the discovered D2D communication nodes according to the determined selection procedure.

To achieve this objective, a device-to-device (D2D) communication selection method for use in a UE is also provided in certain embodiments of the present invention. The UE comprises a receiving interface, a discovering interface and a selecting interface. The D2D communication selection method comprising:

(A) enabling the receiving interface to receive D2D communication information;

(B) enabling the discovering interface to discover D2D communication nodes; and (C) enabling the selecting interface to determine at least one selection procedure from a plurality of selection procedures according to the D2D communication information and select at least one first D2D communication target from the discovered D2D communication nodes according to the determined selection procedure.

According to the above descriptions, a UE and a D2D communication selection method thereof are included in the present invention. More particularly, the present invention can receive various D2D communication information before performing the D2D communication. At least one selection procedure can be determined from a plurality of selection procedures according to the D2D communication information. Then, at least one communication target suitable for performing the D2D communication can be selected according to the determined selection procedure. With the aforesaid operations, a suitable selection procedure can be determined from the plurality of selection procedures depending on different conditions, needs and environments or the like, and a UE suitable for performing the D2D communication can be selected according to the determined selection procedure. Thereby, waste of the pre-existing wireless frequency spectrums can be effectively avoided.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

A brief description of the drawings are made as follows, but this is not intended to limit the present invention.

DETAILED DESCRIPTION

In the following description, the present invention will be explained with reference to example embodiments thereof. However, these example embodiments are not intended to limit the present invention to the specific examples, embodiments, environment, applications, structures, process flows or steps described in these example embodiments. In other words, description of these example embodiments is only for the purpose of illustration rather than to limit the present invention. In the attached drawings, elements unrelated to the present invention are omitted from depiction; and dimensional relationships among individual elements are illustrated only for ease of understanding but not to limit the actual scale.

An embodiment of the present invention (briefly called as "the first embodiment" hereinafter) is a wireless communication system. Preferably, the wireless communication system conforms to the basis architecture of the LET technology of 3GPP. This means that the basic architecture conforms to the standards formulated for the LTE series technologies, including the LTE technology, the LTE-Advanced technology, and precursor technologies of the LTE technology (e.g., UMTS (Universal Mobile Telecommunications System), GSM (Global System for Mobile Communications) and etc.). The wireless communication system may comprise at least one base station (i.e., one or more base stations) and a plurality of user equipments (UEs).

Figure 1:
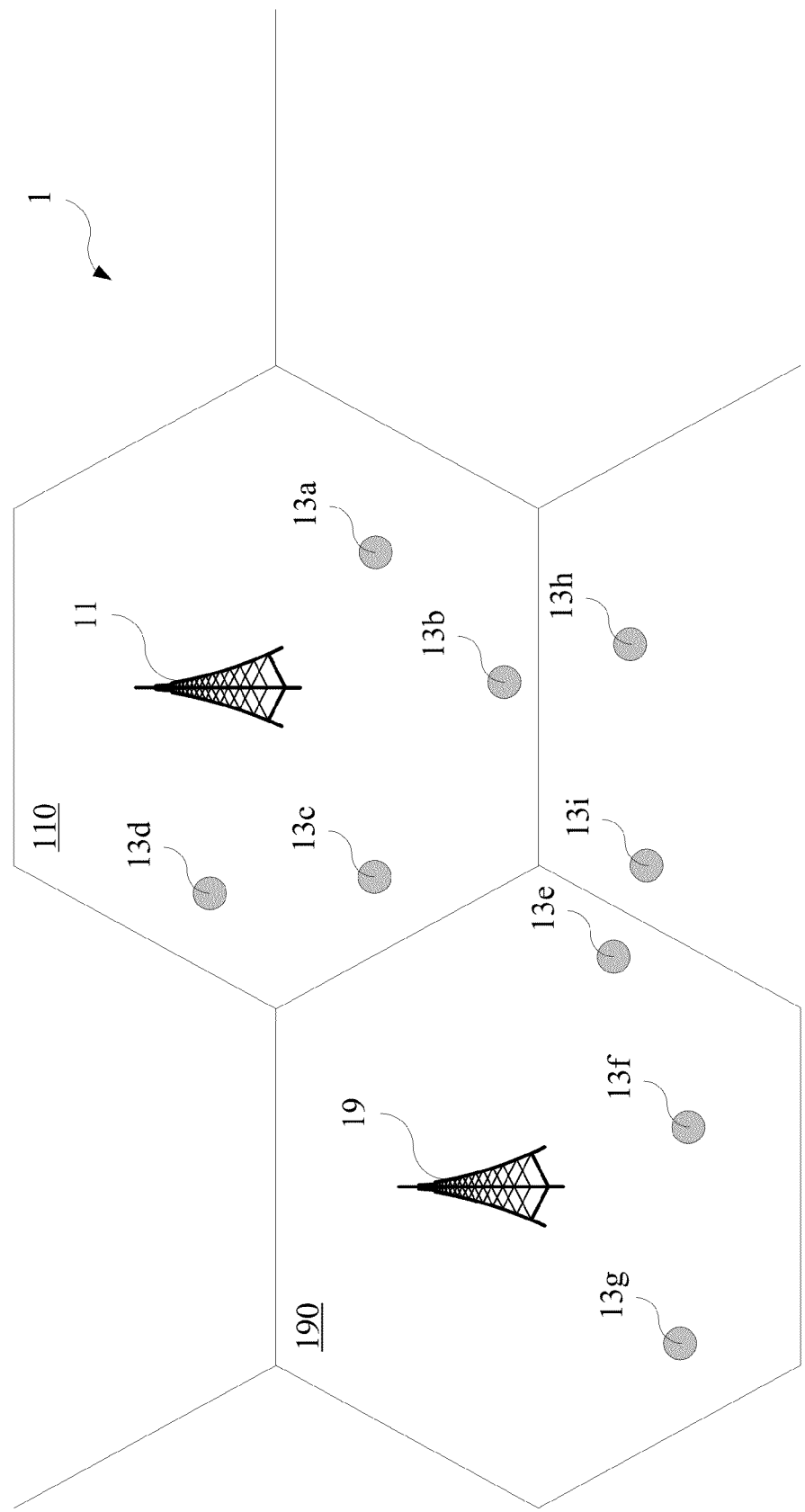
FIG. 1 is a schematic structural view of a wireless communication system according to an embodiment of the present invention.

FIG. 1 is a schematic structural view illustrating the wireless communication system described above. As shown in FIG. 1, the wireless communication system 1 may comprise a base station 11, a base station 19 and a plurality of UEs 13a-13i. In the basic architecture of the LTE technology of 3GPP, each of the base stations 11 and 19 may be an eNodeB, and each of the UEs 13a-13i may be a UE. The base station 11 may have a signal coverage 110, and the base station 19 may have a signal coverage 190. The UEs 13a, 13b, 13c and 13d are located within the signal coverage 110 of the base station 11, and the UEs 13e, 13f and 13g are located within the signal coverage 190 of the base station 19. Additionally, the UEs 13h and 13i are not located in the signal coverage of any base stations. The number of base stations and coverages thereof, or the number of UEs and locations thereof shown in FIG. 1 are all provided for the purpose of illustration, but not to limit the present invention.

Within the wireless communication system 1, various information can be exchanged between the individual base stations (e.g., between the base station 11 and the base station 19). Additionally, various information can also be exchanged between the UEs 13a-13i because D2D communication can be performed between the UEs 13a-13i and each of the UEs 13a-13i may optionally be a relay having a relaying function. Therefore, various information (e.g., D2D communication information 20) can be exchanged between the base station 11, the base station 19 and the UEs 13a-13i within the wireless communication system 1.

Relays having a relaying function may be classified into a first kind and a second kind, and only the second kind of relays can support UE-to-Network relaying. Relay may have the following properties:

1. A relay shall transmit the synchronous channel, the reference symbols and so on that it has (not the base station identification, but the group identification); and 2. The UE can receive scheduling information or Hybrid Automatic Repeat reQuest (HARQ) feedback directly from the relay, and can also transmit an uplink Scheduling Request (SR), a Channel Quality Indicator (CQI) and an acknowledgement to the relay.

If data needs to be relayed from the UE 13a to other UEs (e.g., the UEs 13c-13e) via the UE 13b, the UE 13b can acquire additional information to indicate relay information necessary for the UE 13a. This information helps the UE 13b to know equipments (e.g., all equipments other than the UE 13a and/or the UE 13b) that would be involved in the relaying process. These equipments may be UEs, equipments with functions similar to a base station, or UEs from a UE group that are related to the D2D communication target. The related information may comprise information which help the UE 13b to know the information necessary for contention or for scheduling, and various data from the UE 13a. Such information can be further transmitted to a higher layer to decide how to manage the transmission (e.g., the transmission time sequence, the transmission priority order, the sub-group resource allocation and etc). Here, the upper layer may include but is not limited to: the Radio Resource Management (RRM) layer, the Radio Resource Control (RRC) layer, the Non-Access Stratum (NAS) layer, the D2D specific layer, the Medium Access Control (MAC) layer, the Packet Data Convergence Protocol (PDCP) layer, and/or the Radio Link Control (RLC) layer.

In case there is a need to divide devices into sub-groups, the UE that acts as a relay might be able to handle the hierarchical mode resource allocation, and if necessary, the original resource can be divided for use in communication between devices of sub-groups. A UE or the UE that acts as a relay may also allow a scheduling and/or contention mechanism to be established for these resources. For example, some resources are used for scheduling, and some resources are used for contention. The UE or the UE that acts as a relay may also detect and use some remaining resource blocks for contention without the need of resource allocation.

A UE may be chosen as a relay in the group thereof, or may be chosen as a relay when cooperating with a different group (e.g., a UE that may be used as a relay can be discovered through a contention mechanism). For example, if the UE 13a is only able to communicate with the UE 13b, then the UE 13b will be used as a relay to relay D2D data to other UEs (e.g., to the UE 13c and/or the UE 13d).

A UE can broadcast or relay its capability to other UEs. For example, in a case of no contention, a message may be replied when a permit to relaying is obtained in order to relay effective resources to all or a specific part of UEs. Collecting related resources may be performed according to a decision of an upper layer or performed via sequential forwarding. If it is necessary for other UEs to relay or broadcast their own information with a higher priority level, a higher priority order may also be obtained according to the power level. The UE may also broadcast some emergency events. The UE may stop relaying repeated messages by evaluating the number of denial transmissions via an upper-layer counter. The UE may also transmit a specific sequence to stop transmitting or to resist a contention sequence and UE relay capacity.

Each of the UEs 13a-13i may be in an idle mode or a connected mode. Each of the UEs 13a-13i can switch between the idle mode and the connected mode in an RRC interface, an NAS interface or a device-to-device specific interface. Each of the UEs 13a-13i can evaluate the resources and transmit the D2D communication information 20 in the idle mode or the connected mode; and any of the UEs 13a-13i can receive the D2D communication information 20 in the idle mode or the connected mode.

Furthermore, a UE may be in the connected mode or the idle mode. The connected mode may refer to "the wireless connection between the UE and the base station" or "the wireless connection between devices", and the idle mode may refer to "the wireless connection between the base station and the UE being in the idle mode" or "the wireless connection between devices being in the idle mode". In the wireless connected mode between a UE and a base station, it may be that the UE has not created any D2D wireless connection with other UEs, or the UE has created a D2D wireless connection with other UEs. In the wireless idle mode between a UE and a base station, it may be that the UE has not created any D2D wireless connection with other UEs, or the UE has created a D2D wireless connection with other UEs. In the wireless connected mode between a UE and another UE, it may be that the UEs have not created a wireless connection with the base station, or the UEs has created wireless connections with the base station. In the wireless idle mode between a UE and another UE, it may be that the UEs have not created a wireless connection with the base station, or the UEs have created wireless connections with the base station. If a D2D wireless connection between a UE and other UEs is no longer needed after the D2D wireless connection enters into the connected mode, the UE can directly enter into the idle mode. If there is a power saving demand but the function of D2D wireless connection is partly needed, the UE may also not enter into the idle mode directly but adopt a mode that provides the power saving function to save power, and then switch to the connected mode or the idle mode depending on the practical needs. Because a UE can perform D2D communication or communicate by the assistance of the base station within the network coverage, the UE may optionally operate in a full-duplex mode or a half-duplex mode with corresponding resource settings.

Figure 2:
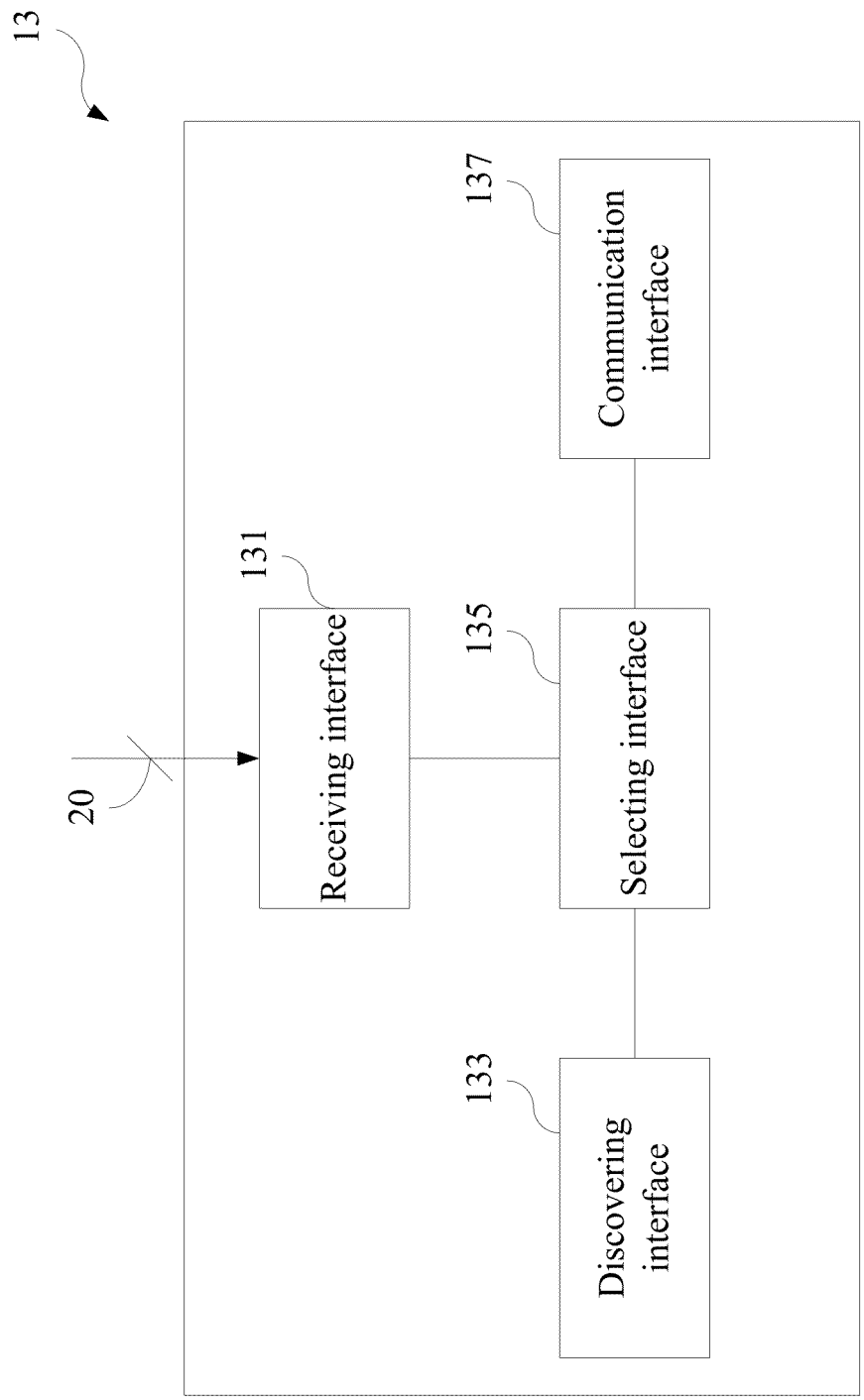
FIG. 2 is a schematic structural view of a UE in the wireless communication system shown in FIG. 1.
Figure 3:
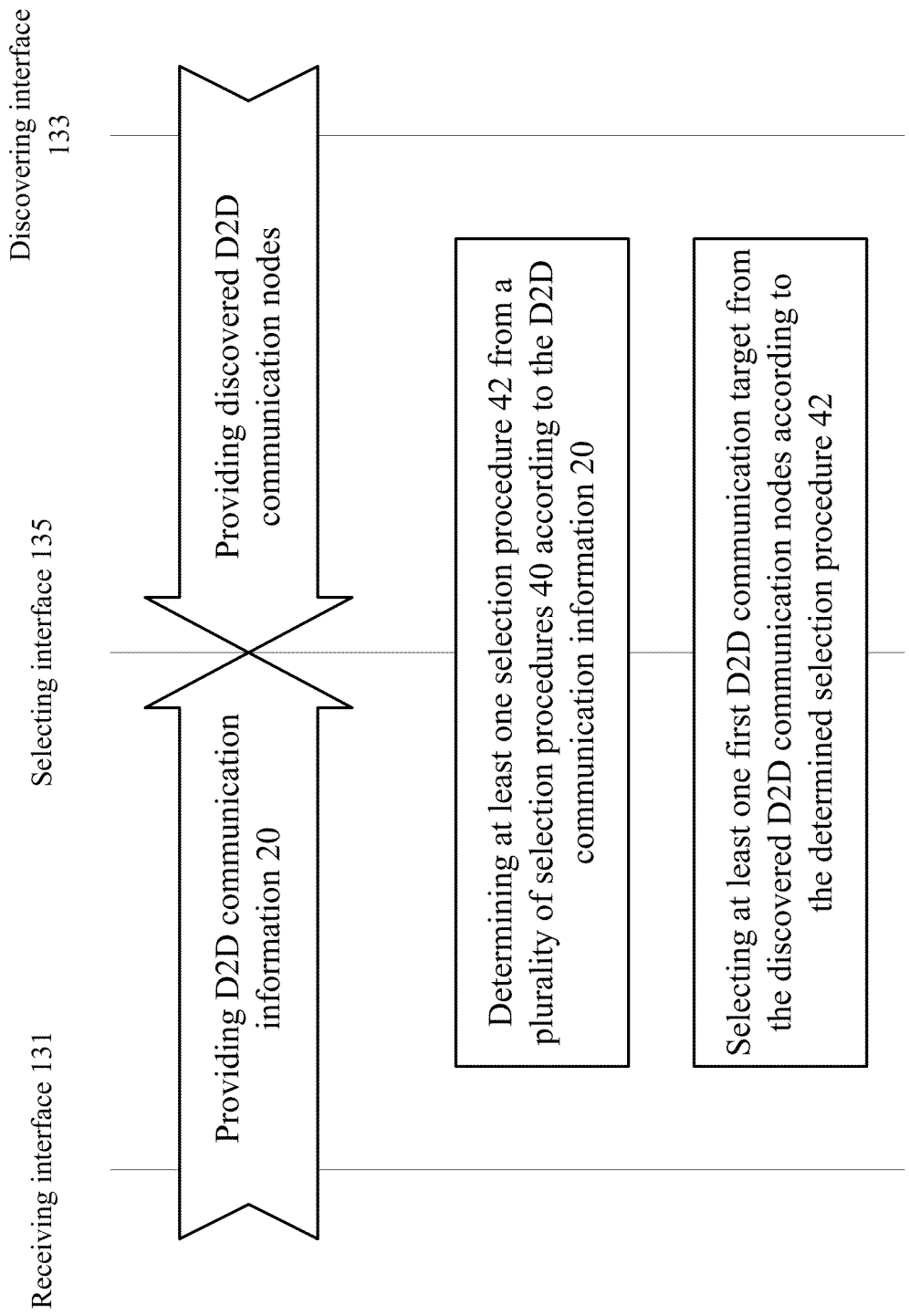
FIG. 3 is a schematic view illustrating operations of the UE shown in FIG. 2.

FIG. 2 is a schematic structural view of any of the UEs 13a-13i in the wireless communication system 1, and FIG. 3 is a schematic view illustrating operations of any of the UEs 13a-13i. For ease of description, any of the UEs 13a-13i will be represented by the UE 13. As shown in FIG. 2, the UE 13 may comprise a receiving interface 131, a discovering interface 133, a selecting interface 135 and a communication interface 137. The receiving interface 131, the discovering interface 133, the selecting interface 135 and the communication interface 137 may be electrically coupled with each other directly or indirectly, and communicate to each other with various messages. Within the wireless communication system 1, the UE 13 can communicate with and exchange information with the base station 11, the base station 19 and other UEs via the communication interface 137.

As shown in FIG. 3, the receiving interface 131 of the UE 13 is configured to receive various D2D communication information 20 and provide the received D2D communication information 20 to the selecting interface 135. The receiving interface 131 of the UE 13 can receive various D2D communication information 20 from a base station (e.g., the base station 11 or the base station 19) in the wireless communication system 1, and can also receive the D2D communication information 20 from other D2D communication nodes. The D2D communication nodes are UEs within the wireless communication system 1. Taking the UE 13a as an example, the receiving interface 131 thereof can receive various D2D communication information 20 from the base station 11, the base station 19 or one of, a part of or all of the UEs 13b-13i. The D2D communication information 20 may include but is not limited to: a public land mobile network identification information, a user equipment identification and relay user equipment identification information, a group identification information, a position information, a channel and transmission condition information, a preconfigured profile information, a Mobility Management Entity (MME) identification information, and a ProSe services/features identification information. Additionally, the UE identification information set forth herein may be the ProSe user equipment identification information, and may be the layer 1 identification and/or the layer 2 identification information transformed from the user equipment identification information or the ProSe user equipment identification information. Similarly, the public land mobile network identification information, the relay user equipment identification information and the group identification information may be themselves or the layer 1 and/or layer 2 identification information transformed therefrom. Additionally, the preconfigured profile may also not be received via the receiving interface 131, but may be selected by the selecting interface 135 according to the preconfigured profile information in the device. The aforesaid information can all be used as criteria for the subsequent selection procedures.

The discovering interface 133 of the UE 13 is configured to discover D2D communication nodes, which it can communicate with, within the wireless communication system 1 in various ways, and provide the discovered D2D communication nodes to the selecting interface 135. Taking the UE 13a as an example, the discovering interface 133 thereof can discover D2D communication nodes within the wireless communication system 1 in various way, and the discovered D2D communication nodes may be one of, a part of or all of the UEs 13b-13i.

Upon receiving the D2D communication information 20 from the receiving interface 131 and receiving the discovered D2D communication nodes from the discovering interface 133, the selecting interface 135 of the UE 13 can determine at least one selection procedure 42 (i.e., determine one or more selection procedures) from a plurality of selection procedures 40 according to the D2D communication information 20. Then, the selecting interface 135 of the UE 13 can select at least one first D2D communication target (i.e., select one or more first D2D communication targets) from the discovered D2D communication nodes according to the determined selection procedure(s) 42. If a plurality of selection procedures 42 is determined by the selecting interface 135 of the UE 13 from the selection procedures 40, at least one first D2D communication target can be selected from the discovered D2D communication nodes according to the determined selection procedures 42 in parallel or sequentially.

The selection procedures 40 may include at least two of a public land mobile network identification selection procedure, a user equipment identification and relay user equipment identification selection procedure, a group identification selection procedure, a position selection procedure, a channel and transmission condition selection procedure, a preconfigured profile selection procedure, an MME identification selection procedure, and a ProSe services/features identification selection procedure. These selection procedures 40 may respectively correspond to the aforesaid various information comprised in the D2D communication information 20. However, these selection procedures 40 may also include other selection procedures which are self-defined by the UE 13, but are not limited to what described above.

Through the aforesaid public land mobile network identification selection procedure, the selecting interface 135 of the UE 13 can select one or more D2D communication nodes corresponding to a specific public land mobile network identification from the discovered D2D communication nodes as the first D2D communication target(s). For example, if only the UEs 13b-13d among the discovered D2D communication nodes correspond to a specific public land mobile network identification defined by the selecting interface 135 of the UE 13a, then the selecting interface 135 of the UE 13a may select only the UEs 13b-13d as the aforesaid first D2D communication targets when executing the public land mobile network identification selection procedure.

Through the aforesaid user equipment identification and relay user equipment identification selection procedure, the selecting interface 135 of the UE 13 can select one or more D2D communication nodes corresponding to a specific user equipment identification and/or a relay user equipment identification from the discovered D2D communication nodes as the first D2D communication target(s). For example, if only the UE 13i among the discovered D2D communication nodes corresponds to a specific user equipment identification and/or a relay user equipment identification defined by the selecting interface 135 of the UE 13a, then the selecting interface 135 of the UE 13a may select only the UE 13i as the aforesaid first D2D communication target when executing the user equipment identification and relay user equipment identification selection procedure.

Through the aforesaid group identification selection procedure, the selecting interface 135 of the UE 13 can select one or more D2D communication nodes corresponding to a specific group identification from the discovered D2D communication nodes as the first D2D communication target(s). For example, if only the UEs 13e-13f among the discovered D2D communication nodes correspond to a specific group identification defined by the selecting interface 135 of the UE 13a, then the selecting interface 135 of the UE 13a may select only the UEs 13e-13f as the aforesaid first D2D communication targets when executing the group identification selection procedure.

Through the aforesaid position selection procedure, the selecting interface 135 of the UE 13 can select one or more D2D communication nodes corresponding to a specific position from the discovered D2D communication nodes as the first D2D communication target(s). For example, if a specific position defined by the selecting interface 135 of the UE 13a is the signal coverage 190 of the base station 19 and only the UEs 13e-13g among the discovered D2D communication nodes are located within the signal coverage 190, then the selecting interface 135 of the UE 13a may select only the UEs 13e-13g as the aforesaid first D2D communication targets when executing the position selection procedure.

Through the aforesaid channel and transmission condition selection procedure, the selecting interface 135 of the UE 13 can select one or more of the discovered D2D communication nodes as the first D2D communication target(s) according to channel conditions between the UE 13 and the respective discovered D2D communication nodes. For example, if only the UE 13d among the discovered D2D communication nodes meets a specific channel condition defined by the selecting interface 135 of the UE 13a, then the selecting interface 135 of the UE 13a may select only the UE 13d as the aforesaid first D2D communication target when executing the channel and transmission condition selection procedure. The specific channel condition may be but not limited to: the channel condition between the UE 13 and the respective discovered D2D communication nodes is such that the noise or interference is lower than a threshold value.

Through the aforesaid channel and transmission condition selection procedure, the selecting interface 135 of the UE 13 may also select one or more of the discovered D2D communication nodes as the first D2D communication target(s) according to channel conditions of the respective discovered D2D communication nodes themselves. For example, if only the UE 13e among the discovered D2D communication nodes meets a specific channel condition defined by the selecting interface 135 of the UE 13a, then the selecting interface 135 of the UE 13a may select only the UE 13e as the aforesaid first D2D communication target when executing the channel and transmission condition selection procedure. The specific channel condition may be but not limited to: the respective discovered D2D communication nodes can ensure signal transmission to the UE 13a.

The UE 13 can learn the channel conditions between the UE 13 and the respective discovered D2D communication nodes and/or the transmission conditions of the discovered D2D communication nodes themselves from the D2D communication information 20. For example, parameters related to the channel and transmission conditions in the D2D communication information 20 may include but are not limited to: the Reference Signal Received Power (RSRP), the Received Signal Strength Indicator (RSSI), the bandwidth, the sub-carriers, the Reference Signal Received Quality (RSRQ), the Reference Signal Signal-to-Interference-plus-Noise Ratio (RS-SINR), the SINR, the Proximity Services Relay Capacity, situations during the transmission and so on. The Proximity Services Relay Capacity may comprise capacity or particular features of the existing system.

Through the aforesaid preconfigured profile selection procedure, the selecting interface 135 of the UE 13 can select one or more of the discovered D2D communication nodes as the first D2D communication target(s) according to a preconfigured profile. For example, if a preconfigured profile of the UE 13e is to communicate with the UEs 13f-13g, then the selecting interface 135 of the UE 13a may select only the UEs 13f-13g as the aforesaid first D2D communication targets when executing the preconfigured profile selection procedure.

If a plurality of the discovered D2D communication nodes is selected as the first D2D communication targets by the selecting interface 135 of the UE 13 according to the determined selection procedure 42, a priority order may be further determined by the selecting interface 135 for these first D2D communication targets. Each of the UEs 13a-13i may announce various information (including the D2D communication information 20) thereof to other UEs so that the other UEs can determine a priority order of the communication targets according to such information and then select communication targets according to the priority order. For example, if the UEs 13b-13d are selected as the first D2D communication targets by the selecting interface 135 of the UE 13a, then a priority order of the UEs 13b-13d may be further determined by the selecting interface 135 according to the D2D communication information 20, a self-defined rule, other conditions, the system/capacity information and/or measurement results. Those having higher priority levels will be preferentially selected as the communication targets.

Figure 4:
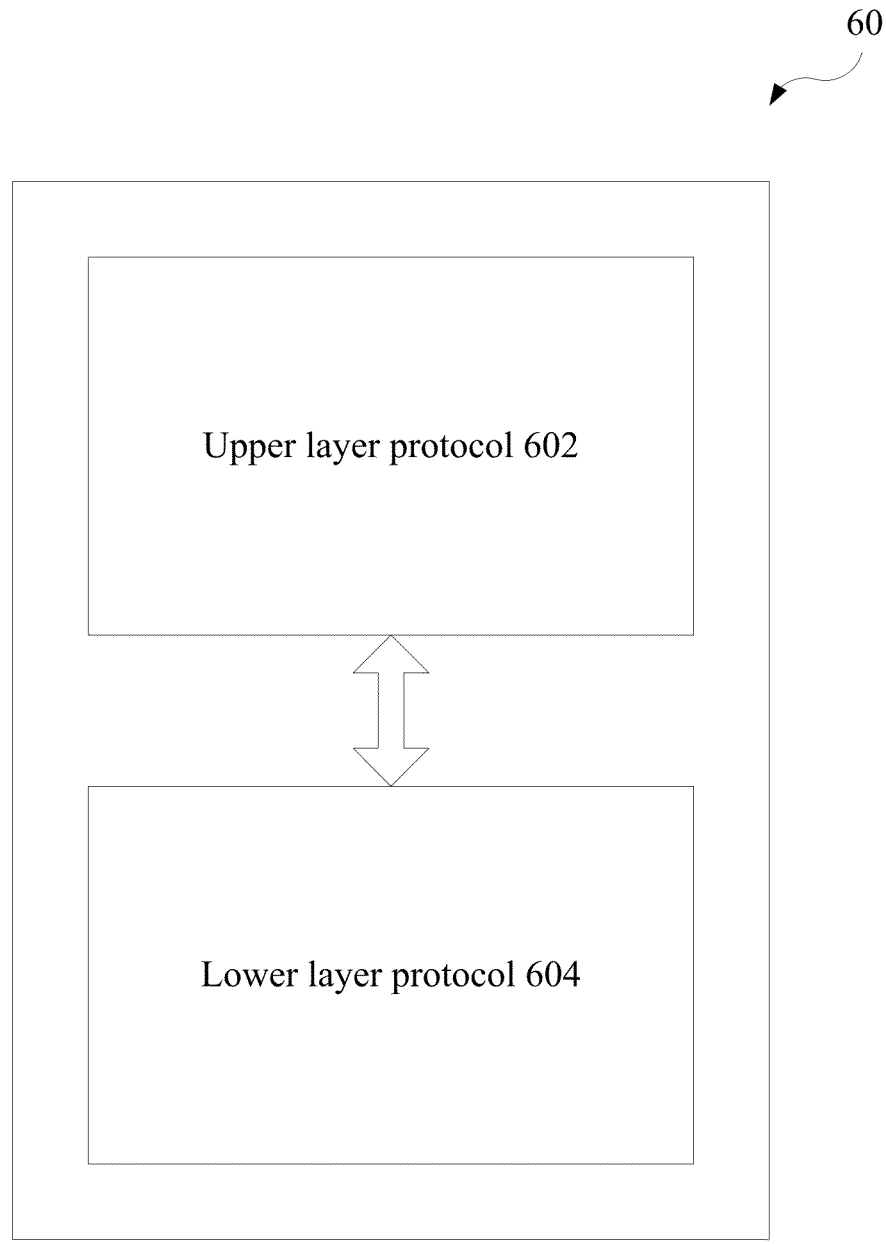
FIG. 4 is a schematic view illustrating a D2D communication protocol architecture of the UE shown in FIG. 2.

FIG. 4 is a schematic view illustrating a D2D communication protocol architecture of the UE 13. As shown in FIG. 4, the UE 13 may operate in a D2D communication protocol architecture 60, which may comprise an upper layer protocol 602 and a lower layer protocol 604. Specifically, the D2D communication protocol architecture 60 divides the communication protocols necessary for the aforesaid operations of the UE 13 into an upper layer and a lower layer. The upper layer and the lower layer correspond to the upper layer protocol 602 and the lower layer protocol 604 respectively, and can exchange information with each other. For example, the upper layer may be an upper layer of a Non-Access Stratum (NAS) and/or a D2D interface layer, and the lower layer may be an Access Stratum (AS) layer. The AS layer may be, for example but not limited to, a lower layer of a Radio Link Control (RLC) layer, a Physical layer, a Radio Resource Control (RRC) layer, a Media Access Control (MAC) layer, a Packet Data Convergence Protocol (PDCP) layer and/or a D2D interface layer. The Physical layer can execute the following operations: group searching, power control, uplink synchronization and uplink timing control, random access related procedures and HARQ related procedures.

Taking a case where the UE 13 executes the public land mobile network identification selection procedure as an example, the upper layer protocol 602 can specify the following operations to be executed by the upper layer in the D2D communication protocol architecture 60: storing a public land mobile network identification list according to the priority order; selecting a specific public land mobile network identification; requesting the lower layer to select a D2D communication node corresponding to the specific public land mobile network identification; for the selection of public land mobile network identification, evaluating an effective public land mobile network identification report provided by the lower layer; and storing an equivalent public land mobile network identification list. Additionally, the lower layer protocol 604 can specify the following operations to be executed by the lower layer in the D2D communication protocol architecture 60: searching for an effective public land mobile network identification; making measurements to support the selection of public land mobile network identification; synchronizing with the channel to identify the public land mobile network identification that is found; and providing the effective public land mobile network identification report to the upper layer.

Taking a case where the UE 13 executes the user equipment identification and relay user equipment identification selection procedure as an example, the upper layer protocol 602 can specify the following operations to be executed by the upper layer in the D2D communication protocol architecture 60: controlling the selection of UE; storing a list of forbidden registration areas, a group identification list and related public land mobile network identifications with which the user equipment and/or relay user equipment is allowed to connect (a group white list); and providing these lists to the lower layer. Additionally, the lower layer protocol 604 can specify the following operations to be executed by the lower layer in the D2D communication protocol architecture 60: making measurements necessary for supporting the selection of user equipment and/or relay user equipment; detecting and synchronizing the channel; receiving and processing the information in the channel; relaying the upper layer system information to the upper layer; searching for an appropriate user equipment and/or relay user equipment; replying to the upper layer regardless of whether such a user equipment and/or relay user equipment is found; and if such a user equipment and/or relay user equipment is found, then selecting the user equipment and/or relay user equipment so as to be connected therewith.

On the other hand, when reselection of an user equipment identification is to be executed, the upper layer protocol 602 can specify the following operations to be executed by the upper layer in the D2D communication protocol architecture 60: controlling the reselection of user equipment and/or relay user equipment, e.g., by means of the list of forbidden registration areas; storing an equivalent public land mobile network identification list and providing it to the lower layer; storing a list of forbidden registration areas and providing it to the lower layer; and storing a group identification list and related public land mobile network identifications and providing them to the lower layer, where the user equipment and/or relay user equipment is allowed to connect with the public land mobile network identifications (a group white list). Additionally, the lower layer protocol 604 can specify the following operations to be executed by the lower layer in the D2D communication protocol architecture 60: making measurements necessary for supporting the reselection of user equipment and/or relay user equipment; detecting and synchronizing a broadcast channel; receiving and processing the broadcast information; relaying the upper layer system information to the upper layer; and if a more appropriate user equipment and/or relay user equipment is found, then replacing the user equipment and/or relay user equipment.

Taking a case where the UE 13 executes the position selection procedure as an example, the upper layer protocol 602 can specify the following operations to be executed by the upper layer in the D2D communication protocol architecture 60: registering the UE to be active; registering presence of the UE in a registered area (e.g., routinely or when entering into a new area); storing the list of forbidden registration areas; and canceling registration of the UE when being powered off. Additionally, the lower layer protocol 604 can specify the following operations to be executed by the lower layer in the D2D communication protocol architecture 60: reporting information of registered areas to the upper layer.

Taking a case where the UE 13 executes the group identification selection procedure as an example, the upper layer protocol 602 can specify the following operations to be executed by the upper layer in the D2D communication protocol architecture 60: providing a request to search for an effective UE group; for the selection of group identifications, evaluates a report about effective UE groups provided by the lower layer; and selecting a group and requesting the lower layer to select UEs belonging to this group. Additionally, the lower layer protocol 604 can specify the following operations to be executed by the lower layer in the D2D communication protocol architecture 60: searching for UEs corresponding to a group identification; reading related channels and information if any UE corresponding to a group identification is found; reporting the group identification of the UE that is found, where the UE broadcasts a group identification and a public land mobile network identification to the upper layer; after a group is selected by the upper layer, selecting any UEs belonging to this group, where the group meets the UE selection criteria; and providing an indication to the upper layer to notify that an access can be made.

The selecting interface 135 of the UE 13 can select at least one first D2D communication target having a relaying function from the discovered D2D communication nodes. Then, the communication interface 137 of the UE 13 can communicate with at least one of the other D2D communication nodes via the first D2D communication target. The first D2D communication target having the relaying function may be a UE having the relaying function. For example, if the UE 13*b* has the relaying function, then when the UE 13*a* is unable to perform D2D communication directly with the UEs 13*i*-13*h*, the selecting interface 135 of the UE 13a can select the UE 13b as the first D2D communication target so that the communication interface 137 of the UE 13a can perform the D2D communication with one or all of the UEs 13i-13h via the UE 13b.

If the at least one first D2D communication target becomes inactive or has a transmission failure before or when the communication interface 137 of the UE 13 communicates with at least one of the other D2D communication nodes via the at least one first D2D communication target, the selecting interface 135 of the UE 13 can determine at least one selection procedure 42 (which may be either the same as or different from the selection procedure 42 determined previously) from the selection procedures 40 according to the D2D communication information 20 again, and select at least one second D2D communication target from the discovered D2D communication nodes according to the selection procedure 42 determined this time. The selecting interface 135 of the UE 13 can select a node having a relaying function from the discovered D2D communication nodes as the second D2D communication target, and then the communication interface 137 of the UE 13 can resume the communication with the previous D2D communication node(s) via the second D2D communication target. The selecting interface 135 of the UE 13 may also select a node not having a relaying function from the discovered D2D communication nodes as the second D2D communication target, and then the communication interface 137 of the UE 13 can communicate with the second D2D communication target instead. The reason why the at least one first D2D communication target becomes inactive or has a transmission failure may be, for example but not limited to: the at least one first D2D communication target is powered off, the transmission condition of itself is poor (e.g., due to a too low signal strength or failure in contention), the channel condition between the at least one first D2D communication target and the UE 13 is poor (e.g., the interference or noise is too large), it is moving away from the UE 13, and so on.

If the UE 13 is to connect with an eligible UE after the first D2D communication target becomes inactive or has a transmission failure, the selecting interface 135 of the UE 13 can select the second D2D communication target from an eligible UE list, or learn candidate UEs from the system information or system setting and then select the second D2D communication target from the candidate UEs. If the UE 13 is to connect with other UEs after the first D2D communication target becomes inactive or has a transmission failure, the selecting interface 135 of the UE 13 can also learn candidate UEs from the system information or system settings and then select the second D2D communication target from the candidate UEs.

The selecting interface 135 of the UE 13 may transmit a notice to the first D2D communication target to release the corresponding D2D bearer after the first D2D communication target becomes inactive or has a transmission failure. The notice may be, for example, an RRC interface or a D2D specific message. If the communication interface 137 of the UE 13 is to communicate with the second D2D communication target through a handover procedure, the selecting interface 135 of the UE 13 can pre-select the second D2D communication target through the aforesaid selection procedure according to the handover procedure before the first D2D communication target becomes inactive or has a transmission failure. The handover procedure comprises sending a handover notice to convert the D2D channel of the first D2D communication target (by means of the RRC interface or the D2D specific message). If the communication interface 137 of the UE 13 is to directly communicate with the second D2D communication target after the first D2D communication target becomes inactive or has a transmission failure, the selecting interface 135 of the UE 13 can select the second D2D communication target through the aforesaid selection procedure according to an attach procedure. The attach procedure comprises discovering D2D communication nodes and creating corresponding D2D channels (by means of the RRC interface or the D2D specific message).

For example, if the UE 13b becomes inactive or has a transmission failure before or when the communication interface 137 of the UE 13a communicates with the UE 13i via the UE 13b (e.g. the UE 13b has moved to the location of the UE 13g, or the D2D communication performed by the UE 13a with the UE 13i via the UE 13b is unsuccessful), then the selecting interface 135 of the UE 13a can determine the UE 13c having a relaying function and capable of communicating with the UE 13i as the second D2D communication target. Then, the communication interface 137 of the UE 13a can resume the communication with the UE 13i via the UE 13c. Further, if no UE can communicate with the UE 13i when the UE 13b becomes inactive or has a transmission failure, then the selecting interface 135 of the UE 13a can select other discovered UEs (e.g., the UE 13b) so that the communication interface 137 of the UE 13a can communicate with the UE 13b instead. Even further, if no UE can communicate with the UE 13i and no UE can communicate with the UE 13a when the UE 13b becomes inactive or has a transmission failure, then the selecting interface 135 of the UE 13a can select the base station 11 so that the communication interface 137 of the UE 13a can communicate with other UEs via the base station 11.

The selecting interface 135 of the UE 13 can select at least one first D2D communication target from the discovered D2D communication nodes so that the communication interface 137 of the UE 13 can communicate with the first D2D communication target. For example, the selecting interface 135 of the UE 13a can select the UEs 13b-13c as the first D2D communication target so that the communication interface 137 of the UE 13a can communicate with one or both of the UEs 13b-13c.

If the first D2D communication target becomes inactive or has a transmission failure before or when the communication interface 137 of the UE 13 communicates with the at least one first D2D communication target, then the selecting interface 135 of the UE 13 can determine at least one selection procedure 42 (which may be either the same as or different from the selection procedure 42 determined previously) from the selection procedures 40 according to the D2D communication information 20 again, and select at least one second D2D communication target from the discovered D2D communication nodes according to the selection procedure 42 determined this time. The selecting interface 135 of the UE 13 can select a node having a relaying function from the discovered D2D communication nodes as the second D2D communication target, and then the communication interface 137 of the UE 13 can resume the communication with the first D2D communication target via the second D2D communication target.

For example, if the at least one first D2D communication target becomes inactive or has a transmission failure to render the communication path between the communication interface 137 of the UE 13 and the first D2D communication target infeasible before or when the communicate interface 137 of the UE 13 communicates with the at least one D2D communication target, then the selecting interface 135 of the UE 13 can select other nodes having a relaying function as the second D2D communication target so that the communication interface 137 of the UE 13 can communicate with the first D2D communication target via the second D2D communication target.

The selecting interface 135 of the UE 13 may also select a node not having a relaying function from the discovered D2D communication nodes as the second D2D communication target, and then the communication interface 137 of the UE 13 can communicate with the second D2D communication target instead. The reason why the at least one first D2D communication target becomes inactive or has a transmission failure may be, for example but not limited to: the at least one first D2D communication target is powered off, the transmission condition of itself is poor (e.g., due to a too low signal strength or failure in contention), the channel condition between the at least one first D2D communication target and the UE 13 is poor (e.g., the interference or noise is too large), it is moving away from the UE 13, and so on.

For example, if the UE 13i becomes inactive or has a transmission failure before or when the communication interface 137 of the UE 13e communicates with the UE 13i (e.g. the UE 13i has moved to the location of the UE 13d, or the D2D communication performed by the UE 13i with the UE 13e is unsuccessful), then the selecting interface 135 of the UE 13e can determine the UE 13c having a relaying function and capable of communicating with the UE 13i as the second D2D communication target. Then, the communication interface 137 of the UE 13e can resume the communication with the UE 13i via the UE 13c. Further, if no UE can communicate with the UE 13i when the UE 13i becomes inactive or has a transmission failure, then the selecting interface 135 of the UE 13e can select other discovered UEs (e.g., the UE 13f) so that the communication interface 137 of the UE 13e can communicate with the UE 13f instead. Even further, if no UE can communicate with the UE 13i and no UE can communicate with the UE 13e when the UE 13i becomes inactive or has a transmission failure, then the selecting interface 135 of the UE 13e can select the base station 19 so that the communication interface 137 of the UE 13e can communicate with other UEs via the base station 19.

Figure 5:
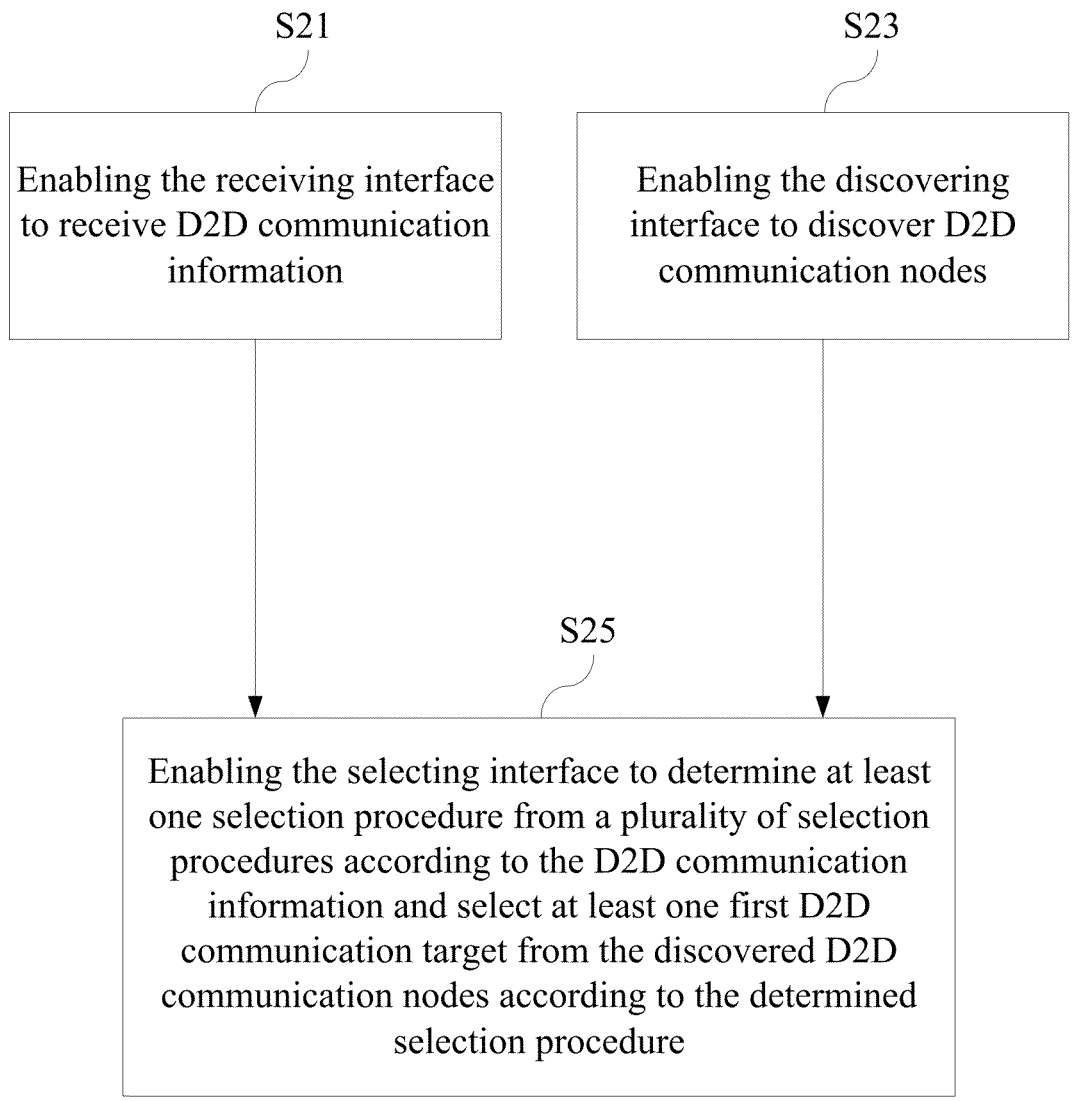
FIG. 5 is a flowchart diagram of a D2D communication selection method for use in a UE according to an embodiment of the present invention.

Another embodiment of the present invention (briefly called as "the second embodiment" hereinbelow) is a device-to-device (D2D) communication selection method for use in a user equipment (UE). The UE comprises a receiving interface, a discovering interface and a selecting interface. For example, the second embodiment may be a D2D communication selection method for use in the UE 13 of the first embodiment. FIG. 5 is a flowchart diagram of the D2D communication selection method. As shown in FIG. 5, the D2D communication selection method comprises the following steps of: Step S21, enabling the receiving interface to receive D2D communication information; Step S23, enabling the discovering interface to discover D2D communication nodes; and Step S25, enabling the selecting interface to determine at least one selection procedure from a plurality of selection procedures according to the D2D communication information and select at least one first D2D communication target from the discovered D2D communication nodes according to the determined selection procedure.

In other embodiments of the present invention, the receiving interface may receive the D2D communication information from a base station or a D2D communication node.

In other embodiments of the present invention, the selection procedures may include at least two of a public land mobile network identification selection procedure, a user equipment identification and relay user equipment identification selection procedure, a group identification selection procedure, a position selection procedure, a channel and transmission condition selection procedure, a preconfigured profile selection procedure, an MME identification selection procedure, and a ProSe services/features selection procedure.

In other embodiments of the present invention, the step S25 further comprises the following step of: enabling the selecting interface to select a plurality of first D2D communication targets from the discovered D2D communication nodes according to the determined selection procedure and determine a priority order of the first D2D communication targets.

In other embodiments of the present invention, the UE operates in a D2D communication protocol architecture which comprises an upper layer protocol and a lower layer protocol.

In other embodiments of the present invention, the UE further comprises a communication interface, and the D2D communication selection method further comprises the following step of: enabling the communication interface to communicate via the first D2D communication target with at least one of the other D2D communication nodes.

In other embodiments of the present invention, the UE further comprises a communication interface, and the D2D communication selection method further comprises the following steps of: enabling the communication interface to communicate with at least one of the other D2D communication nodes via the first D2D communication target; when the first D2D communication target becomes inactive or has a transmission failure, enabling the selecting interface to determine at least one selection procedure again from the selection procedures according to the D2D communication information and select at least one second D2D communication target from the discovered D2D communication nodes according to the determined selection procedure; and enabling the communication interface to communicate with the original D2D communication nodes via the second D2D communication target when the first D2D communication target becomes inactive or has a transmission failure.

In other embodiments of the present invention, the UE further comprises a communication interface, and the D2D communication selection method further comprises the following step of: enabling the communication interface to communicate with the first D2D communication target.

In other embodiments of the present invention, the UE further comprises a communication interface, and the D2D communication selection method further comprises the following steps of: enabling the communication interface to communicate with the first D2D communication target; when the first D2D communication target becomes inactive or has a transmission failure, enabling the selecting interface to determine at least one selection procedure again from the selection procedures according to the D2D communication information and select at least one second D2D communication target from the discovered D2D communication nodes according to the determined selection procedure; and enabling the communication interface to communicate with the first D2D communication target via the second D2D communication target when the first D2D communication target becomes inactive or has a transmission failure.

In other embodiments of the present invention, the UE further comprises a communication interface, and the D2D communication selection method further comprises the following steps of: enabling the communication interface to communicate with the first D2D communication target; when the first D2D communication target becomes inactive or has a transmission failure, enabling the selecting interface to determine at least one selection procedure again from the selection procedures according to the D2D communication information and select at least one second D2D communication target from the discovered D2D communication nodes according to the determined selection procedure; and enabling the communication interface to communicate with the second D2D communication target instead when the first D2D communication target becomes inactive or has a transmission failure.

In addition to the aforesaid steps, the D2D communication selection method of the second embodiment can also execute all steps corresponding to operations of the UE 13 of the first embodiment. The method in which the D2D communication selection method of the second embodiment executes the corresponding steps will be readily appreciated by those of ordinary skill in the art based on the explanation of the first embodiment, and thus will not be further described herein.

According to the above descriptions, a UE and a D2D communication selection method thereof are provided in the present invention. More particularly, the present invention can receive various D2D communication information before performing the D2D communication. At least one selection procedure can be determined from a plurality of selection procedures according to the D2D communication information. Then, at least one communication target suitable for performing the D2D communication can be selected according to the determined selection procedure. With the aforesaid operations, a suitable selection procedure can be determined from the plurality of selection procedures depending on different conditions, needs and environments or the like, and a UE suitable for performing the D2D communication can be selected according to the determined selection procedure. Thereby, waste of the pre-existing wireless frequency spectrums can be effectively avoided.

The above disclosure is related to the detailed technical contents and inventive features thereof. People skilled in this field may proceed with a variety of modifications and replacements based on the disclosures and suggestions of the invention as described without departing from the characteristics thereof. Although such modifications and replacements are not fully disclosed in the above descriptions, they have substantially been covered in the following claims as appended.

What is claimed is:

1. A user equipment (UE), comprising:
   a receiving interface, being configured to receive device-to-device (D2D) communication information;
   a discovering interface, being configured to discover D2D communication nodes; and
   a selecting interface coupled to the receiving interface and the discovering interface, being configured to determine at least one selection procedure from a plurality of selection procedures according to the D2D communication information and select at least one first D2D communication target from the discovered D2D communication nodes according to the determined selection procedure; and
   a communication interface coupled with the selecting interface;
   wherein the communication interface communicates with at least one of the other D2D communication nodes via the first D2D communication target; and
   wherein when the first D2D communication target becomes inactive or has a transmission failure, the selecting interface determines at least one selection procedure again from the selection procedures according to the D2D communication information and selects at least one second D2D communication target from the discovered D2D communication nodes according to the determined selection procedure, and the communication interface communicates with the original D2D communication nodes via the second D2D communication target.

2. The UE as claimed in claim 1, wherein the receiving interface receives the D2D communication information from a base station or a D2D communication node.

3. The UE as claimed in claim 1, wherein the selection procedures include at least two of a public land mobile network identification selection procedure, a user equipment identification and relay user equipment identification selection procedure, a group identification selection procedure, a position selection procedure, a channel and transmission condition selection procedure, and a preconfigured profile selection procedure.

4. The UE as claimed in claim 1, wherein the selecting interface selects a plurality of first D2D communication targets from the discovered D2D communication nodes according to the determined selection procedure, and determines a priority order of the first D2D communication targets.

5. The UE as claimed in claim 1, wherein the UE operates in a D2D communication protocol architecture which comprises an upper layer protocol and a lower layer protocol.

6. The UE as claimed in claim 1, wherein the communication interface communicates with the first D2D communication target.

7. The UE as claimed in claim 6, wherein when the first D2D communication target becomes inactive or has a transmission failure, the selecting interface determines at least one selection procedure again from the selection procedures according to the D2D communication information and selects at least one second D2D communication target from the discovered D2D communication nodes according to the determined selection procedure, and the communication interface communicates with the first D2D communication target via the second D2D communication target.

8. The UE as claimed in claim 6, wherein when the first D2D communication target becomes inactive or has a transmission failure, the selecting interface determines at least one selection procedure again from the selection procedures according to the D2D communication information and selects at least one second D2D communication target from the discovered D2D communication nodes according to the determined selection procedure, and the communication interface communicates with the second D2D communication target instead.

9. A device-to-device (D2D) communication selection method for use in a user equipment (UE), the UE comprising a receiving interface, a discovering interface and a selecting interface, the D2D communication selection method comprising:
   (A) receiving D2D communication information by the receiving interface;
   (B) discovering D2D communication nodes by the discovering interface; and
   (C) determining by the selecting interface at least one selection procedure from a plurality of selection procedures according to the D2D communication information and selecting at least one first D2D communication target from the discovered D2D communication nodes according to the determined selection procedure;
   wherein the UE further comprises a communication interface, and the D2D communication selection method further comprises:
   (D1) communicating by the communication interface with at least one of the other D2D communication nodes via the first D2D communication target;

(E1) when the first D2D communication target becomes inactive or has a transmission failure, determining by the selecting interface at least one selection procedure again from the selection procedures according to the D2D communication information and selecting at least one second D2D communication target from the discovered D2D communication nodes according to the determined selection procedure; and (F1) communicating by the communication interface with the original D2D communication nodes via the second D2D communication target when the first D2D communication target becomes inactive or the transmission fails.

10. The D2D communication selection method as claimed in claim 9, wherein the receiving interface receives the D2D communication information from a base station or a D2D communication node.

11. The D2D communication selection method as claimed in claim 9, wherein the selection procedures include at least two of a public land mobile network identification selection procedure, a user equipment identification and relay user equipment identification selection procedure, a group identification selection procedure, a position selection procedure, a channel and transmission condition selection procedure, and a preconfigured profile selection procedure.

12. The D2D communication selection method as claimed in claim 9, wherein the step (C) further comprises:
   selecting by the selecting interface a plurality of first D2D communication targets from the discovered D2D communication nodes according to the determined selection procedure and determining a priority order of the first D2D communication targets.

13. The D2D communication selection method as claimed in claim 9, wherein the UE operates in a D2D communication protocol architecture which comprises an upper layer protocol and a lower layer protocol.

14. The D2D communication selection method as claimed in claim 9, wherein the D2D communication selection method further comprises:
   (D2) communicating by the communication interface with the first D2D communication target.

15. The D2D communication selection method as claimed in claim 14, further comprising:
   (E2) when the first D2D communication target becomes inactive or has a transmission failure, determining by the selecting interface at least one selection procedure again from the selection procedures according to the D2D communication information and selecting at least one second D2D communication target from the discovered D2D communication nodes according to the determined selection procedure; and
   (F2) communicating by the communication interface with the first D2D communication target via the second D2D communication target when the first D2D communication target becomes inactive or the transmission fails.

16. The D2D communication selection method as claimed in claim 14, further comprising:
   (E3) when the first D2D communication target becomes inactive or has a transmission failure, determining by the selecting interface at least one selection procedure again from the selection procedures according to the D2D communication information and selecting at least one second D2D communication target from the discovered D2D communication nodes according to the determined selection procedure; and
   (F3) communicating by the communication interface with the second D2D communication target instead when the first D2D communication target becomes inactive or the transmission fails.

* * * * *